United States Patent
Ito

(10) Patent No.: US 9,094,637 B2
(45) Date of Patent: Jul. 28, 2015

(54) PRINT SYSTEM, SERVER APPARATUS AND PRINTER WHICH ARE USED IN THE PRINT SYSTEM, AND CONTROL METHOD OF THE PRINT SYSTEM

(75) Inventor: Yuki Ito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 13/471,145

(22) Filed: May 14, 2012

(65) Prior Publication Data
US 2012/0314250 A1    Dec. 13, 2012

(30) Foreign Application Priority Data

Jun. 9, 2011  (JP) ................................. 2011-129251

(51) Int. Cl.
*G06F 3/12* (2006.01)
*H04N 1/44* (2006.01)
*H04N 1/00* (2006.01)

(52) U.S. Cl.
CPC ............ *H04N 1/4406* (2013.01); *G06F 3/1296* (2013.01); *H04N 1/00127* (2013.01); *H04N 1/00204* (2013.01)
USPC .......... 358/1.15; 358/1.14; 358/1.13; 726/27; 709/218

(58) Field of Classification Search
USPC .......... 358/1.13, 1.14, 1.15, 1.16; 726/4, 5, 6, 726/27, 28, 29, 30; 709/218, 219
See application file for complete search history.

(56) References Cited

U.S. PATENT DOCUMENTS

| 7,262,872 | B2 | 8/2007 | Nakamura |
| 8,351,068 | B2 | 1/2013 | Koyana |
| 8,373,876 | B2 | 2/2013 | Watanabe |
| 8,749,821 | B2 * | 6/2014 | Godavari et al. ............. 358/1.15 |
| 2003/0098990 | A1 | 5/2003 | Nakamura |
| 2006/0170966 | A1 | 8/2006 | Watanabe |
| 2007/0081186 | A1 | 4/2007 | Numata |

(Continued)

FOREIGN PATENT DOCUMENTS

| CN | 101334714 | 12/2008 |
| JP | 2002-366329 | 12/2002 |

(Continued)

OTHER PUBLICATIONS

Korean Office Action dated May 9, 2014 issued during prosecution of related Korean application No. 10-2012-0059058.

(Continued)

*Primary Examiner* — Vu B Hang
(74) *Attorney, Agent, or Firm* — Fitzpatrick, Cella, Harper & Scinto

(57) ABSTRACT

A server apparatus comprises an instruction transmitting unit that transmits an instruction to a user apparatus, the instruction instructing the user apparatus to send to the printer a print request for pull printing including authorized information used for an authorizing process at the time of receiving the print service. A printer comprises a receiving unit that receives the print request for pull printing including the authorized information sent from the user apparatus according to the instruction, and a request transmitting unit that transmits, in accordance with the received print request for pull printing including the authorized information, the authorized information and a document obtaining request to the server apparatus.

7 Claims, 15 Drawing Sheets

(56) References Cited

U.S. PATENT DOCUMENTS

| | | |
|---|---|---|
| 2009/0303547 A1 | 12/2009 | Kurihara |
| 2011/0058208 A1 | 3/2011 | Takahashi |
| 2011/0299130 A1 | 12/2011 | Ito |
| 2012/0162708 A1 | 6/2012 | Hagiwara et al. |

FOREIGN PATENT DOCUMENTS

| | | | |
|---|---|---|---|
| JP | 2003-208381 | | 7/2003 |
| JP | 2004-272673 | | 9/2004 |
| JP | 2006-285840 | | 10/2006 |
| JP | 2009-70240 | | 4/2009 |
| JP | 2009070240 A | * | 4/2009 |
| JP | 2009-176286 | | 8/2009 |
| JP | 2009-199253 | | 9/2009 |
| JP | 2009-294920 | | 12/2009 |
| JP | 2011-48812 | | 3/2011 |

OTHER PUBLICATIONS

Chinese Office Action dated Jan. 4, 2015 issued during prosecution of related Chinese application No. 201210192128.3. (Whole English-language translation included.).

Japanese Office Action dated Apr. 28, 2015 issued during prosecution of related Japanese application No. 2011-129251.

* cited by examiner

FIG. 6

| | DOCUMENT NAME | DATE | THE NUMBER OF PAGES | SIZE |
|---|---|---|---|---|
| ☐ | aaa.doc | 3/1/2011 10:00 | 10 p | 100 k |
| ☐ | bbb.pdf | 3/10/2011 12:00 | 5 p | 200 k |
| ☐ | ccc.doc | 3/20/2011 9:00 | 20 p | 300 k |

LIST OF DOCUMENTS 805  801  802  803  804

PRINT
806

FIG. 8A

```
<CreatePrintJobRequest>                    1001
    <PrintTicket>
        <JobDescription>
            <JobName>Sample-Job</JobName>
            <JobOriginatingUserName>Sample-User</JobOriginatingUserName>
        </JobDescription>
    </PrintTicket>
</CreatePrintJobRequest>
```

FIG. 8B

```
<CreatePrintJobRequest>                    1011
    <JobId>1</JobId>
</CreatePrintJobResponse>                  1012
```

FIG. 8C

```
<AddDocumentRequest>                       1021
    <JobId>1</JobId>
    <DocumentDescription>
        <DocumentId>1</DocumentId>
        <Compression>Gzip</Compression>
        <Format>unknown</Format>
        <httpExtension>                    1022
            <Header>
                <Name>Authorization</Name>         1023
                <Value>aaaaaaaaaa</Value>
            </Header>                              1024
            <Header>                               1025
                <Name>x-document-id</Name>
                <Value>bbbbbbbbbb</Value>
            </Header>                              1026
        </httpExtension>
    </DocumentDescription>
    <LastDocument>1</LastDocument>
    <DocumentUrl>http://PrintServer.ddd.co.jp/job</DocumentUrl>    1027
</AddDocumentRequest>
```

FIG. 8D

```
GET /job HTTP/1.1                          1031
Host: PrintServer.ddd.co.jp
Authorization: aaaaaaaaaa                  1032
x-document-id: bbbbbbbbbb
Connection: Keep-Alive                     1033
```

| Name | Value |
|---|---|
| Authorization | aaaaaaaaaa |
| x-document-id | bbbbbbbbbb |

```
<AddDocumentRequest>————1501
    <JobId>1</JobId>
    <DocumentDescription>
        <DocumentId>1</DocumentId>
        <Compression>Gzip</Compression>
        <Format>unknown</Format>
        <httpExtension>
            <Header>————1502
                <Name>x-document-id</Name>
                <Value>bbbbbbbbbb</Value>
            </Header>
        </httpExtension>
    </DocumentDescription>
    <LastDocument>1</LastDocument>
    <DocumentUrl>http://PrintServer.ddd.co.jp/job</DocumentUrl>
</AddDocumentRequest>
```

FIG. 14B

```
<Fault>————1511
    <Code>
        <Value>Receiver</Value>
        <Subcode>————1512
            <Value>ServerErrorAuthorizationNotFound</Value>
        </Subcode>
    </Code>
    <Reason>————1513
        <Text xml:lang="en">Specified Authorization not found</Text>
    </Reason>
</Fault>
```

PRINT SYSTEM, SERVER APPARATUS AND PRINTER WHICH ARE USED IN THE PRINT SYSTEM, AND CONTROL METHOD OF THE PRINT SYSTEM

BACKGROUND OF THE INVENTION

1. Field of the Invention

The present invention relates to a print system corresponding to a print service, a server apparatus and printer which are used in the print system, and a control method of the print system.

2. Description of the Related Art

Such a system that a client apparatus (user apparatus) provided in the Intranet of a company is enabled to use various kinds of services provided on the Internet has been proposed. In such a system, generally, a firewall is provided at a boundary between the Intranet and the Internet.

The firewall has been set in such a manner that although a connection from the Intranet side to the Internet side is permitted, a connection from the Internet side to the Intranet side is refused. Thus, an invasion from an apparatus on the Internet side into the Intranet is protected. In consideration of such a background, in a communication system using the Web in the related art, the client apparatus requests a server apparatus to obtain information and the server apparatus returns the information (pull communication).

In the related art, a print system which is used in a company can be used through the Internet. Since the firewall exists, an offer of the print service to the client apparatus through the Internet is realized by the pull communication in which an image forming apparatus in the Intranet tries to obtain a print job existing in a print server on the Internet. A print process which is realized by the pull communication is called a pull print process.

Japanese Patent Application Laid Open No. 2009-294920 discloses a remote printing system in which various kinds of information of a plurality of apparatuses connected through a network is collected while assuring a security from a server side. According to such a system, the user performs an authentication to a print server by a client computer and uploads a print job into the print server. An intervening apparatus in the Intranet periodically inquires of the print server on the Internet, and if the print job to a printer in the Intranet exists, the apparatus receives the print job and transfers to the printer.

In a system for executing the pull print process of WSD (Web Services on Devices), the following print process is executed. That is, the client computer transmits a pull printing request to the image forming apparatus in the Intranet. The pull printing request includes a URL of the print job of the print server existing on the Internet. The image forming apparatus which received the pull printing request obtains the print job to the print server and executes the print process in response to the obtained print job.

In the system for executing the pull print process in the related art, an authentication at the time when the image forming apparatus obtains the print job to the print server is made by using authentication information which has been set every image forming apparatus. However, such an authentication is an authentication of every image forming apparatus and the authentication of every user cannot be performed.

There is now considered a method whereby the client computer transmits token information for executing the authenticating (or authorizing) process of every user to the image forming apparatus, so that the image forming apparatus executes the authenticating process or authorizing process of every user when it obtains the print job to the print server. However, according to such a method, in the case where a kind of token information which is used in the print system is added or changed later, software of the image forming apparatus has to be changed.

It is an object of the invention to provide a print system for executing a pull print process, wherein an authenticating process of every user who receives a print service can be executed, and even in the case of changing token information which is used in the authenticating process, there is no need to change software of the image forming apparatus.

SUMMARY OF THE INVENTION

In order to achieve the object, the present invention provides a print system including a server apparatus for providing a print service and a printer for printing a document. The server apparatus comprises an instruction transmitting unit that transmits an instruction to a user apparatus, the instruction instructing the user apparatus to send to the printer a print request for pull printing including authorized information used for an authorizing process at the time of receiving the print service. The printer comprises a receiving unit that receives the print request of the pull printing including the authorized information sent from the user apparatus according to the instruction transmitted by the instruction transmitting unit, and a request transmitting unit that transmits, in accordance with the print request for pull printing, the authorized information and a document obtaining request to the server apparatus. The authorizing process is executed on the basis of the authorized information transmitted by the request transmitting unit without requesting a user to input authentication information. Based on authorization in the authorizing process, the server apparatus transmits a requested document to the printer in response to the document obtaining request transmitted by the request transmitting unit.

Further features of the present invention will become apparent from the following description of exemplary embodiments with reference to the attached drawings.

BRIEF DESCRIPTION OF THE DRAWINGS

FIG. 6 is a diagram illustrating an example of a document list display screen.

FIGS. 8A, 8B, 8C and 8D are diagrams illustrating an example of requests/responses which are transmitted and received in a print system.

FIGS. 14A and 14B are an example of a pull printing request and a failure response to the pull printing request.

DESCRIPTION OF THE EMBODIMENTS

Exemplary embodiments of the invention will be described hereinbelow with reference to the drawings.

First Embodiment

Figure 1:
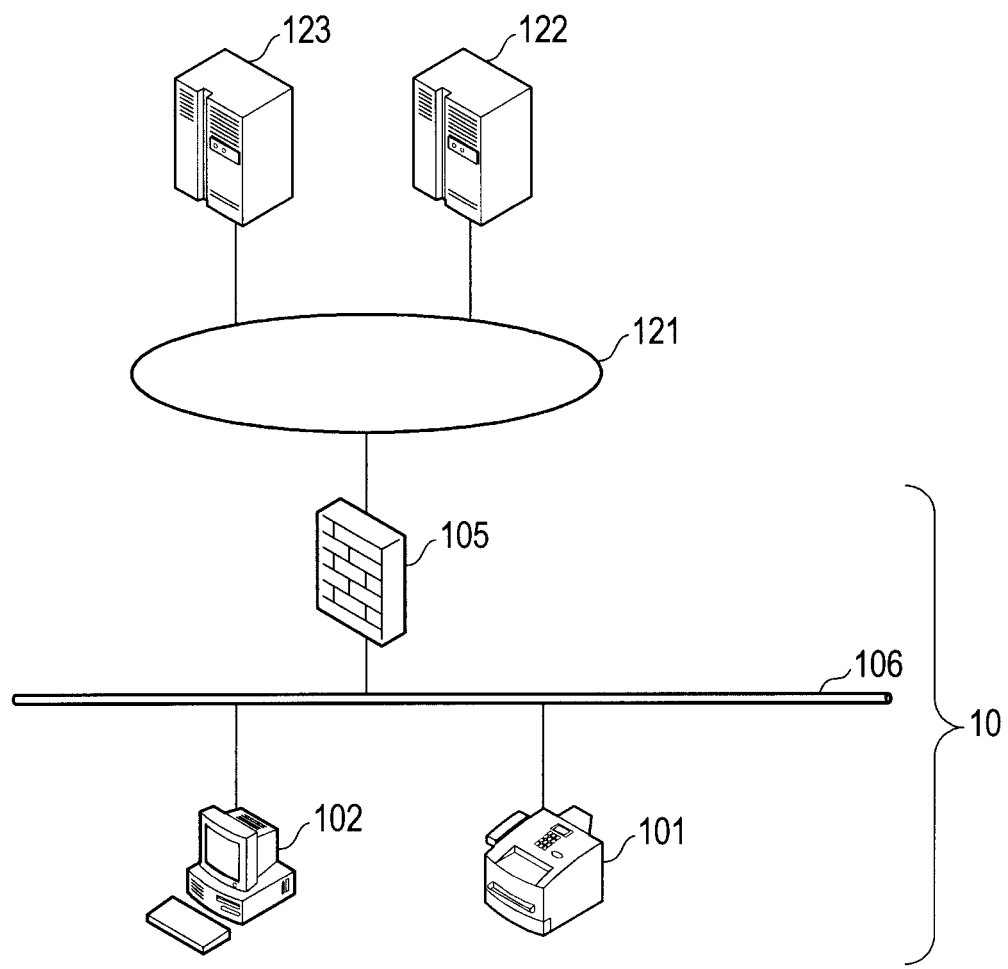
FIG. 1 is a diagram illustrating an example of a system construction according to the invention.

FIG. 1 is a diagram illustrating an example of a system construction according to the invention. The print system illustrated in FIG. 1 has an image forming apparatus 101, a client computer 102, an authentication server 122, and a print server 123.

The client computer 102 and the authentication server 122 are provided in an Intranet 10 and can mutually communicate through a network 106 such as an LAN (Local Area Network) or the like. The print server 123 and the authentication server 122 are connected to a network 121 such as an Internet or the like. A firewall 105 is provided at a boundary between the network 121 and the Intranet.

Although only one Intranet is illustrated in FIG. 1, a plurality of Intranets having a construction similar to that of the Intranet 10 may exist. Similarly, the number of image forming apparatuses and the number of client computers are not limited to the numbers illustrated in FIG. 1.

The image forming apparatus 101 has a function of obtaining a print job stored in the print server 123 from the print server 123 and printing. The client computer 102 is a user apparatus by which the user instructs a desired image forming apparatus to print. The print server 123 is a server apparatus in the embodiment and controls the whole print system.

The print server 123 executes various kinds of processes such as process according to a print request from the client computer 102, management of the print job, and management of the image forming apparatus. The print server 123 also has a function as a document management server for managing a document corresponding to each user. The authentication server 122 executes an authenticating process or an authorizing process of the user who accesses the print server 123. Therefore, the authentication server 122 manages token information which is used in the authenticating process or authorizing process of the user. The server apparatus of the embodiment may be constructed by the print server 123 and the authentication server 122. A print processing method of the embodiment is realized by a function of each processing apparatus provided for the system illustrated in FIG. 1. A computer program of the embodiment is characterized in that a computer is allowed to execute the print processing method.

Figure 2:
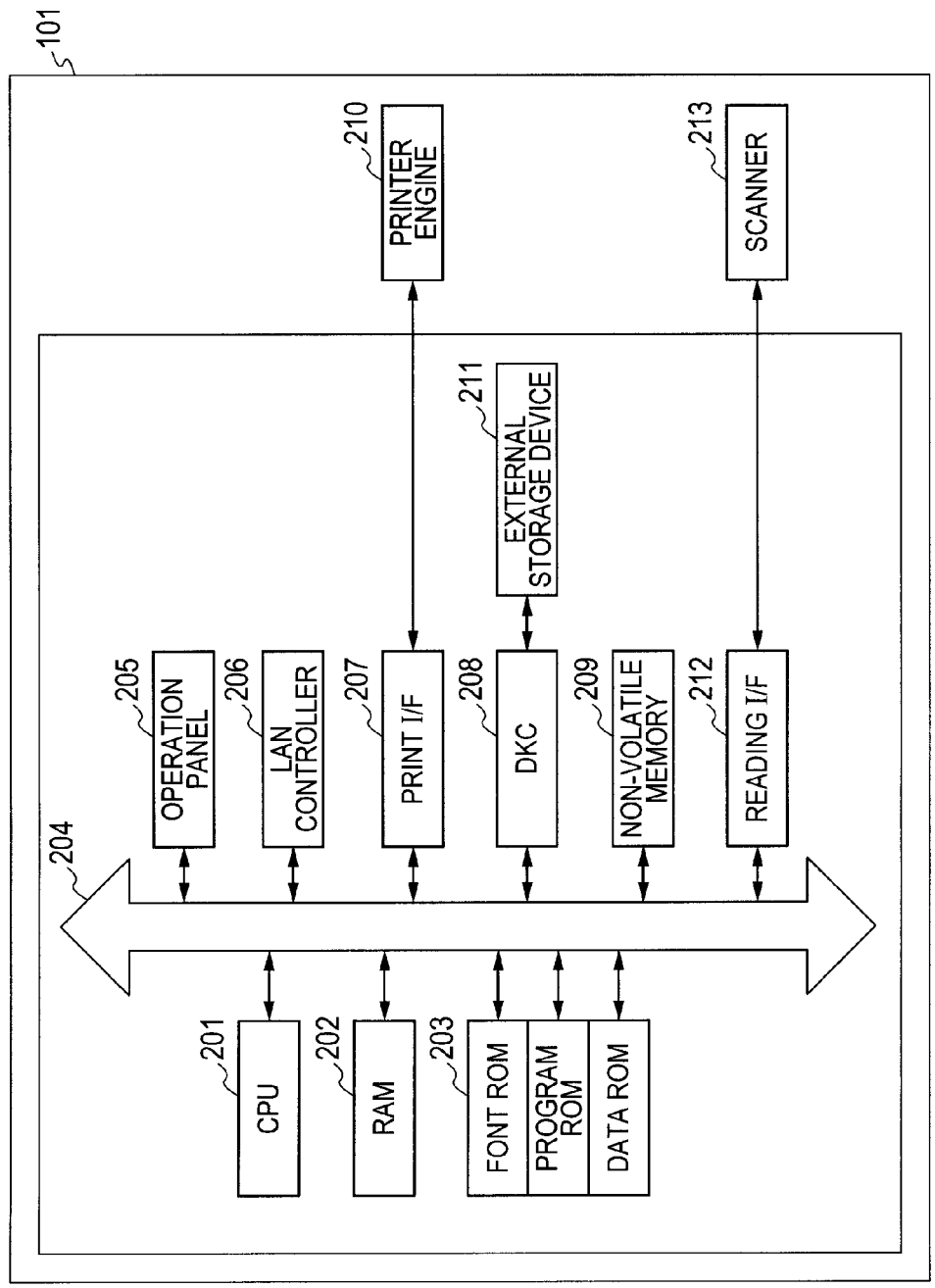
FIG. 2 is a diagram illustrating an example of a hardware construction of an image forming apparatus.

FIG. 2 is a diagram illustrating an example of a hardware construction of the image forming apparatus. The image forming apparatus illustrated in FIG. 2 is, for example, a copying apparatus. A CPU 201 provided for the image forming apparatus 101 integratedly controls accesses to various kinds of devices connected to a system bus 204 on the basis of a control program stored in a program ROM in a ROM 203 or stored in an external storage device 211. The CPU is an abbreviation of Central Processing Unit. The ROM is an abbreviation of Read Only Memory.

The CPU 201 outputs an image signal serving as output information to a print unit (printer engine) 210 connected through a print interface 207. The CPU 201 controls an image signal which is input from a reading unit (scanner) 213 connected through a reading interface 212.

The control program and the like which can be executed by the CPU 201 have previously been stored in the program ROM in the ROM 203. Font data (including outline font data) and the like which are used when the CPU 201 forms the foregoing output information have previously been stored in a font ROM in the ROM 203. Information and the like which are used in the client computer have previously been stored in a data ROM in the ROM 203. The CPU 201 executes a process for communicating with the client computer or image forming apparatus on the network through a LAN controller 206.

A RAM 202 is a storing unit functioning mainly as a main memory, a work memory, or the like of the CPU 201. RAM is an abbreviation of Random Access Memory. The RAM 202 is constructed in such a manner that a memory capacity can be expanded by an option RAM which is connected to an expansion port (not shown). The RAM 202 is used, for example, as an output information development area, an environment data storage area, or the like.

An access of the external storage device 211 such as hard disk (HDD), IC card, or the like is controlled by a disk controller (DKC) 208. The hard disk is used as a job storage area for storing an application program, font data, form data, and the like, temporarily spooling the print job, and controlling the spooled job from an outside. In the embodiment, it is assumed that the HDD is used as an external storage device 211 and various kinds of logs such as job log, image log, and the like are stored in the hard disk.

The hard disk is also used as a BOX data storage area for holding image data read out by the scanner 213 and image data of a print job as BOX data.

The client computer 102 can refer to the BOX data held in the BOX data storage area through the network or can instruct the printing of the BOX data. The number of external storage devices 211 is not limited to 1. The external storage device 211 may be constructed in such a manner that a plurality of option font cards and a plurality of external memories in each of which a program for interpreting a printer control language of a different language system has been stored can be connected in addition to the built-in fonts.

An operation panel 205 inputs various kinds of information according to the operations of software keys by the user. A non-volatile memory 209 stores various kinds of setting information which are set from the operation panel 205.

Although not shown, various kinds of expanding apparatuses such as finisher for performing a staple and sorting functions, duplex printing apparatus for realizing a duplex printing function, and the like can be further attached as options to the image forming apparatus 101. The operations of those various kinds of expanding apparatuses are controlled by the CPU 201.

Figure 3:
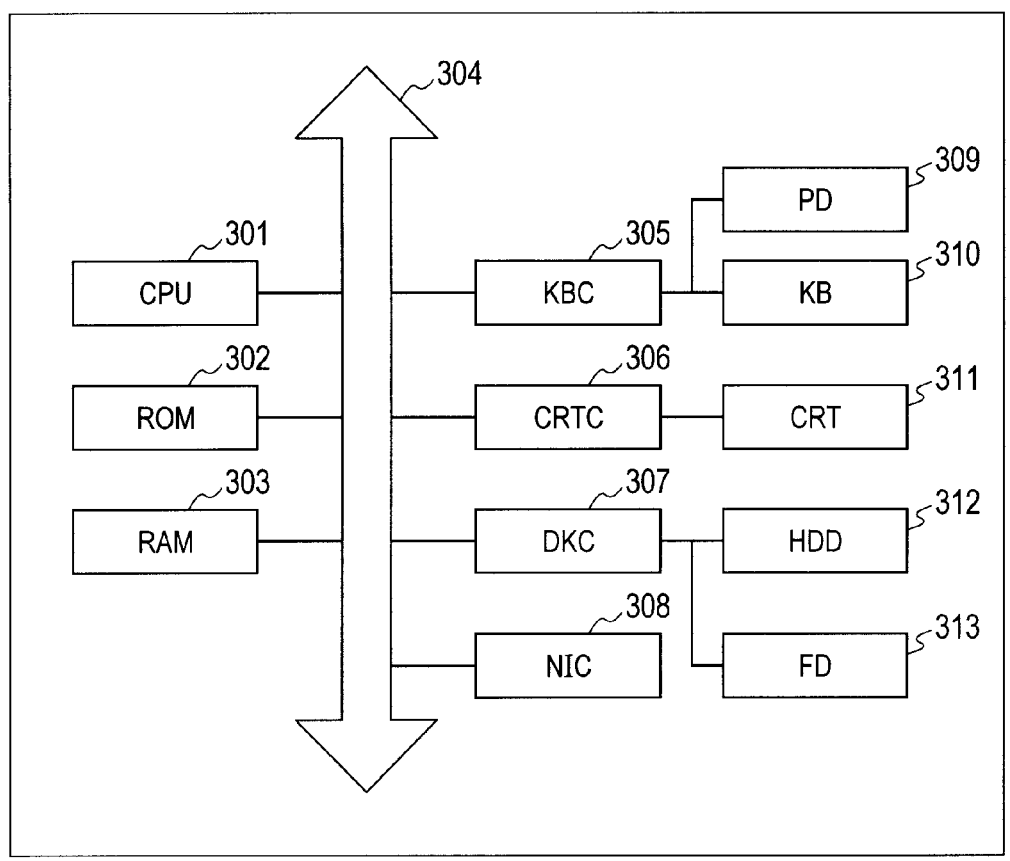
FIG. 3 is a diagram illustrating an example of a hardware construction of a client computer, a print server, and an authentication server.

FIG. 3 is a diagram illustrating an example of a hardware construction of the client computer, print server, and authentication server. A CPU 301 controls various kinds of devices connected to a system bus 304. A BIOS and a boot program have been stored in a ROM 302. A RAM 303 is used as a main storage device of the CPU 301.

A keyboard controller (KBC) 305 executes a process according to an information input from a pointing device (PD) 309 such as a mouse (registered trade mark) or the like or a keyboard (KB) 310. A display control unit (CRTC) 306 has a video memory therein. The CRTC 306 draws image data in the video memory in accordance with an instruction from the CPU 301. The CRTC 306 outputs the image data drawn in the video memory to a CRT display apparatus 311 as a video signal in accordance with an instruction from the CPU 301.

Although the CRT is illustrated in FIG. 3 as an example of the display apparatus, a kind of display apparatus is not limited. For example, the display apparatus may be a liquid crystal display apparatus or the like. A disk controller (DKC) 307 accesses a hard disk (HDD) 312 or a floppy (registered trade mark) disk (FD) 311. A network interface card (NIC) 308 is connected to the network and makes information communication through the network.

An OS, various kinds of application programs which operate on the OS, and the like are stored in the HDD 312. When a power source of the apparatus is turned on, in accordance with the boot program stored in the ROM 302, the CPU 301 reads out the OS from the HDD 312, stores into the RAM 303, and allows the apparatus to function as an information processing apparatus.

Figure 4A:
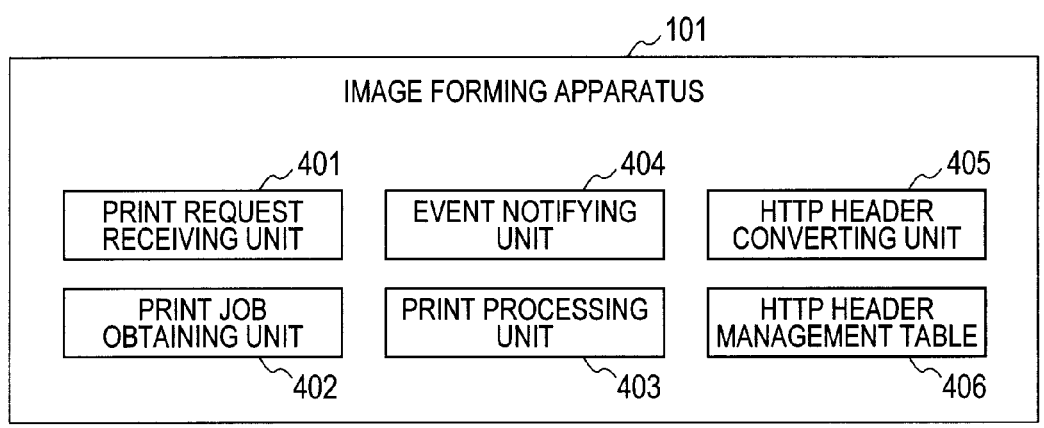
FIGS. 4A and 4B are functional block diagrams of the image forming apparatus and the client computer.
Figure 4B:
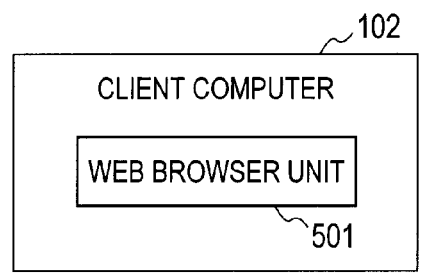

FIGS. 4A and 4B are an example of functional block diagrams of the image forming apparatus and the client computer. FIG. 4A illustrates the functional block diagram of the image forming apparatus. The image forming apparatus 101 has a print request receiving unit 401, a print job obtaining unit 402, a print processing unit 403, an event notifying unit 404, an HTTP header converting unit 405, and an HTTP header management table 406.

The print request receiving unit 401 receives (obtains) a print job forming request and a pull printing request from the client computer 102. The print request receiving unit 401 transmits the print job forming request to the print job obtaining unit. The print request receiving unit 401 transmits address information (URL) of a print job included in the pull printing request to the print job obtaining unit 402. The URL includes an address and a path of the print server 123 in which the print job has been stored.

The print request receiving unit 401 interprets a format of the pull printing request, obtains HTTP expansion information included in the pull printing request, and stores into the HTTP header management table 406 serving as a storing unit. The print request receiving unit 401 transmits the HTTP expansion information to the HTTP header converting unit 405.

The HTTP header converting unit 405 mechanically converts the HTTP expansion information, forms an HTTP header which is used in an obtaining request of the print job, and transmits to the print job obtaining unit 402. Specifically speaking, the HTTP header converting unit 405 functions as an obtaining unit for obtaining token information which is described in the HTTP expansion information and is used for authentication or authorization of the user of the client computer 102 and the information showing the print data corresponding to the print request. The HTTP header converting unit 405 describes the obtained token information and the information showing the print data into the HTTP header and transmits the HTTP header to the print job obtaining unit 402.

That is, the HTTP header converting unit 405 and the print job obtaining unit 402 are a print data obtaining requesting unit for allowing the token information included in the obtained print request of the pull printing to be included in the print data obtaining request and performing the print data obtaining request to the print server 123. A more detailed operating process of the HTTP header converting unit 405 will be described hereinafter with reference to FIG. 7.

The HTTP expansion information is stored in the HTTP header management table 406. The print job obtaining unit 402 forms a print job obtaining request having the HTTP header received from the HTTP header converting unit 405.

When the print request is received from the print request receiving unit 401, the print job obtaining unit 402 forms a print job including JobID for identifying the print job. The print job obtaining unit 402 transmits the print job obtaining request to the URL received from the print request receiving unit 401. That is, the image forming apparatus 101 interprets a format of the pull printing request, obtains the token information, and performs a request (print data obtaining request) for obtaining the print data in which the token information is included in the HTTP header to the print server 123 through the network.

The print job obtaining unit 402 receives the print job as a response to the print job obtaining request and transmits to the print processing unit 403. When the authentication or authorization is made based on the token information, the print job is transmitted from the print server 123. The print processing unit 403 analyzes the print job, develops into a bit map, and prints onto a sheet. That is, the print processing unit 403 functions as a print unit for performing a print output on the basis of the print data included in the print job. The event notifying unit 404 notifies the print server 123 of a state of the print job such as a job end or the like.

FIG. 4B illustrates the functional block diagram of the client computer. The client computer 102 has a Web browser unit 501. In accordance with the operation of the user of the client computer 102, the Web browser unit 501 accesses the print server 123 and performs a login request and a print request to the print server 123.

The Web browser unit 501 also functions as a pull printing requesting unit. That is, the Web browser unit 501 executes a Java (registered trade mark) Script (control command to the client computer described by a Script language) included in the response received from the print server 123. As an operation peculiar to the embodiment, the Web browser unit 501 executes JavaScript of the response to the print request which is returned from the print server 123, thereby forming the pull printing request and transmitting the formed pull printing request to the image forming apparatus 101. That is, the client computer 102 forms the pull printing request in response to an instruction of the print server 123. In other words, the print server 123 returns the response to the print request to the client computer 102, thereby instructing the client computer 102 which made the print request so as to add the token information to the print request of the pull printing.

The pull printing request is the print request of the pull printing. The Web browser unit 501 executes an expansion including the token information to the format of the pull printing request and forms the pull printing request. Specifically speaking, the Web browser unit 501 forms the pull printing request including the HTTP expansion information in which the token information that was made to correspond to the user has been described. The token information is information which was made to correspond to the user of the client computer 102 and is used for the authentication or authorization of the user at the time when the client computer 102 receives a print service from the print server 123. The Web browser unit 501 transmits the formed token information to the image forming apparatus 101.

In the embodiment, a case where the response returned from the print server 123 includes JavaScript will be described as an example. However, in the invention, a Script language other than JavaScript can be also applied.

Figure 5A:
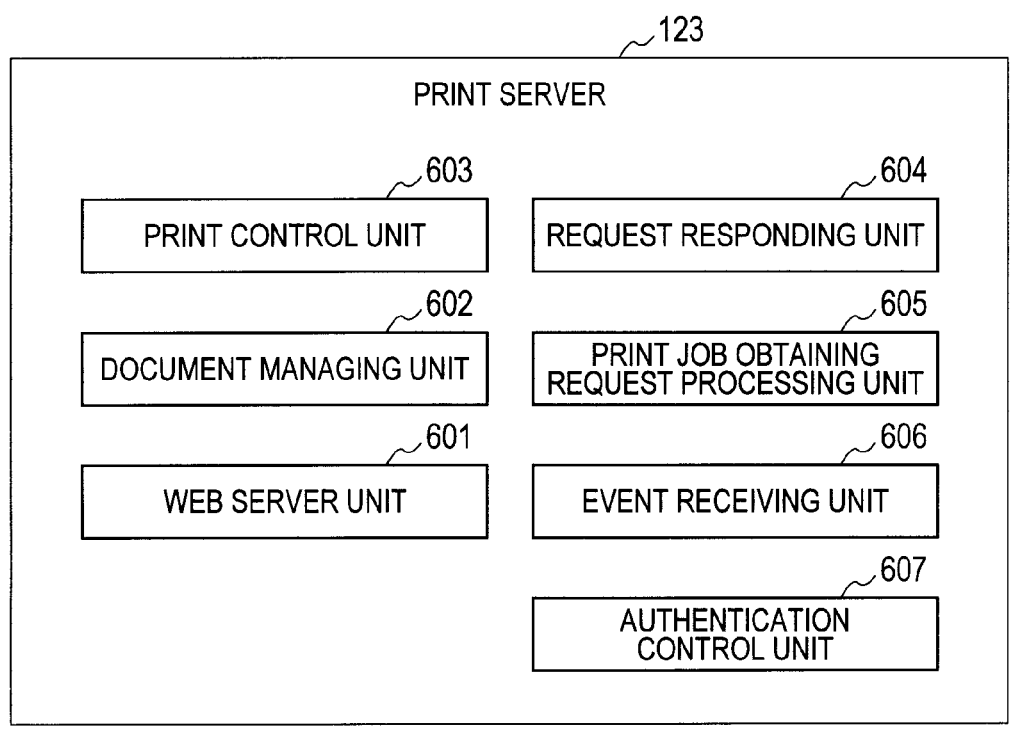
FIGS. 5A and 5B are an example of functional block diagrams of the print server and the authentication server.
Figure 5B:
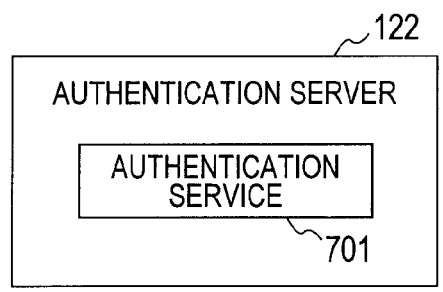

FIGS. 5A and 5B are an example of functional block diagrams of the print server and the authentication server. FIG. 5A illustrates the functional block diagram of the print server.

The print server 123 has a Web server unit 601, a document managing unit 602, a print control unit 603, a request responding unit 604, a print job obtaining request processing unit 605, an event receiving unit 606, and an authentication control unit 607.

The Web server unit 601 provides a UI to the client computer 102 and receives a request formed/transmitted in accordance with the user operation on the UI from the client computer 102. For example, the Web server unit 601 receives a login request from the client computer 102. The Web server unit 601 also functions as a print request receiving unit for receiving the print request of the print data from the client computer 102. The print request includes information for designating the image forming apparatus by which the user wants to execute the print process.

For example, the Web server unit 601 receives a print job obtaining request from the image forming apparatus 101 and transmits to the print job obtaining request processing unit 605. The print job obtaining request is a request for allowing the image forming apparatus 101 to request the transmission of the print job including the print data to be subjected to the print process. Specifically speaking, the image forming apparatus 101 receives the pull printing request to which the token information has been added from the client computer 102, obtains the token information from the print request of the pull printing, and transmits the print data obtaining request including the token information to the print server. The Web server unit 601 of the print server 123 functions as a data obtaining request receiving unit for receiving the print data obtaining request.

The Web server unit 601 executes a process according to the request received from the client computer 102 or the image forming apparatus 101. For example, a case where the Web server unit 601 received a login request is presumed. The Web server unit 601 receives a result of the authenticating process of the user who performed the login request from the authentication control unit 607, which will be described hereinafter. If the result of the authenticating process indicates that the authentication of the user is successful, the Web server unit 601 returns document information of the user which is managed by the document managing unit 602 to the client computer 102.

When the Web server unit 601 receives the print request from the client computer 102, the Web server unit 601 transmits the print request to the print control unit 603 and the request responding unit 604. The print control unit 603 forms a print job corresponding to the image forming apparatus which is designated by the print request received from the Web server unit 601 and temporarily stores into the storing unit.

The authentication control unit 607 transmits a user name, a password, and an authentication token to the authentication server 122. Specifically speaking, when the Web server unit 601 receives the login request from the client computer 102, the authentication control unit 607 executes the following process. The authentication control unit 607 transmits a user ID and a password of the user of the client computer 102 included in the login request to the authentication server 122 and performs an authenticating request of the user. The authentication control unit 607 receives a result of the authenticating process of the user which was executed by the authentication server 122 in response to the authenticating request of the user from the authentication server 122 and transmits to the Web server unit 601.

If the authentication server 122 succeeded in the authentication of the user, the authentication control unit 607 functions as a token obtaining unit for obtaining the token information. Specifically speaking, together with the result of the authenticating process of the user, the authentication control unit 607 receives the authentication token which was issued from the authentication server 122 and was made to correspond to the user.

When the Web server unit 601 receives the print job obtaining request from the image forming apparatus 101, the authentication control unit 607 obtains the authentication token from the HTTP header of the print job obtaining request, transmits the obtained authentication token to the authentication server 122, and performs the authenticating request of the user. It is also possible to construct in such a manner that the authentication control unit 607 obtains an authorization token from the HTTP header of the print job obtaining request, transmits the obtained authorization token to the authentication server 122, and performs an authorizing request of the user. A difference between the authentication token and the authorization token will now be described. The authorization token is information which can receive all services without executing the authenticating process for inputting the authentication information such as user ID, password, and the like. Although the authorization token is substantially the same as the authentication token with respect to a point that there is no need to execute the authenticating process for inputting the authentication information such as user ID, password, and the like, the authorization token is such information that services which can be received can be restricted by handling of the server which issues the authorization token. In the embodiment, those two kinds of information in which there is no need to execute the authenticating process for inputting the user ID, password, and the like are generally called token information or authorized information. That is, the token information is information which is issued by the print server 123. When the print service is received from the print server 123, the user is authenticated or authorized without inputting the user authentication information. The token information is not limited to those two kinds of information.

The authentication control unit 607 receives a result of the authenticating/authorizing process of the user which was executed by the authentication server 122 on the basis of the authentication/authorization token from the authentication server 122 and transmits to the print job obtaining request processing unit 605. That is, the authentication control unit 607 and the authentication server 122 are an authentication/authorization processing unit for obtaining the token information included in the HTTP header from the print data obtaining request and executing the authenticating process or the authorizing process of the user which was made to correspond to the token information on the basis of the token information.

The request responding unit 604 receives the print request from the Web server unit 601. The request responding unit 604 functions as a print request responding unit for returning a response to the print request to the client computer 102 through the network 121. The response to the print request includes JavaScript for allowing the client computer 102 to form/transmit the print job forming request and the pull printing request. In the response to the print request, the authentication token corresponding to the user of the client computer 102 of a transmitting source of the print request is included in the HTTP expansion information. JavaScript is a script for allowing the client computer 102 to execute such an expansion that the authentication token and the information showing the print data corresponding to the print request are included in the format of the print request of the pull printing.

By executing JavaScript included in the response to the print request, the client computer 102 forms the pull printing request including the authentication token included in the HTTP expansion information and transmits to the image forming apparatus 101 through the network 106.

The print job obtaining request processing unit 605 receives the print job obtaining request from the Web server unit 601. The print job obtaining request processing unit 605 functions as a print data transmitting unit for executing the following control process. When the result of the authenticating/authorizing process of the user which was received from the authentication control unit 607 indicates a failure of the authentication/authorization, the print job obtaining request processing unit 605 does not transmit the print job to the image forming apparatus 101. When the result of the authenticating/authorizing process of the user which was received from the authentication control unit 607 indicates a success of the authentication/authorization, the print job obtaining request processing unit 605 transmits the print job to the image forming apparatus 101. Specifically speaking, the print job obtaining request processing unit 605 obtains the print job which is designated by the print job obtaining request from the storing unit and transmits to the image forming apparatus 101. That is, the print job obtaining request processing unit 605 functions as a print data transmitting unit for transmitting the print data corresponding to the print data obtaining request to the image forming apparatus 101 when the user is authenticated or authorized. The event receiving unit 606 receives a notification of a state of the print job from the image forming apparatus 101.

FIG. 5B illustrates a functional block diagram of the authentication server. The authentication server 122 has an authentication service 701. The authentication service 701 is realized by a function of an application installed in the authentication server 122. The authentication service 701 holds the authentication information such as user ID, password, authentication token, and the like for accessing the print server 123. When the login request is received from the client computer 102, the print server 123 performs the authenticating request to the authentication service 701.

The authentication service 701 collates the user ID and password included in the login request from the client computer 102 with the user ID and password held in the authentication service 701. On the basis of a result of the collation, the authentication service 701 executes the authenticating (or authorizing) process of the user. When the authentication is successful, the authentication service 701 issues the authentication token which was made to correspond to (the user ID and password of) the authenticated user. The authentication service 701 transmits the issued authentication token to the print server 123, client computer 102, and image forming apparatus 101 in accordance with necessity.

When the print job obtaining request is received from the image forming apparatus 101, the print server 123 performs the authenticating request to the authentication service 701. In accordance with the authenticating request, the authentication service 701 executes the authenticating (or authorizing) process of the user by collating the authentication token included in the HTTP header of the print job obtaining request with the authentication token held in the authentication service 701. The authentication service 701 transmits a result of the authenticating process of the user to the print server 123.

Subsequently, a flow of the print process in the print system of the embodiment will be described. The client computer 102 receives an input of the user and transmits the login request including the user name and password to the print server 123. The print server 123 performs the authenticating request including the received user name and password to the authentication server 122.

The authentication server 122 collates the user name and password received from the print server 123 with the held user name and password. When the authentication of the user is successful, the Web server unit 601 of the print server 123 transmits a Web page necessary to display a document list corresponding to the relevant user managed by the document managing unit 602 to the client computer 102. The Web browser unit 501 of the client computer 102 which received the Web page displays a document list display screen illustrated in FIG. 6.

FIG. 6 is a diagram illustrating an example of the document list display screen. A list of documents which can be accessed by the user who has logged-in is displayed on the document list display screen together with various kinds of information such as document name 801, date 802, the number of pages 803, and size 804. When the user checks a check box 805 of a desired document on the document list display screen and depresses a print button 806, the Web browser unit 501 of the client computer 102 transmits a request (print request) for requesting the printing of the document to the print server 123. The print request includes information for designating the image forming apparatus 101 which has previously been input by the user and executes the print process.

Figure 7:
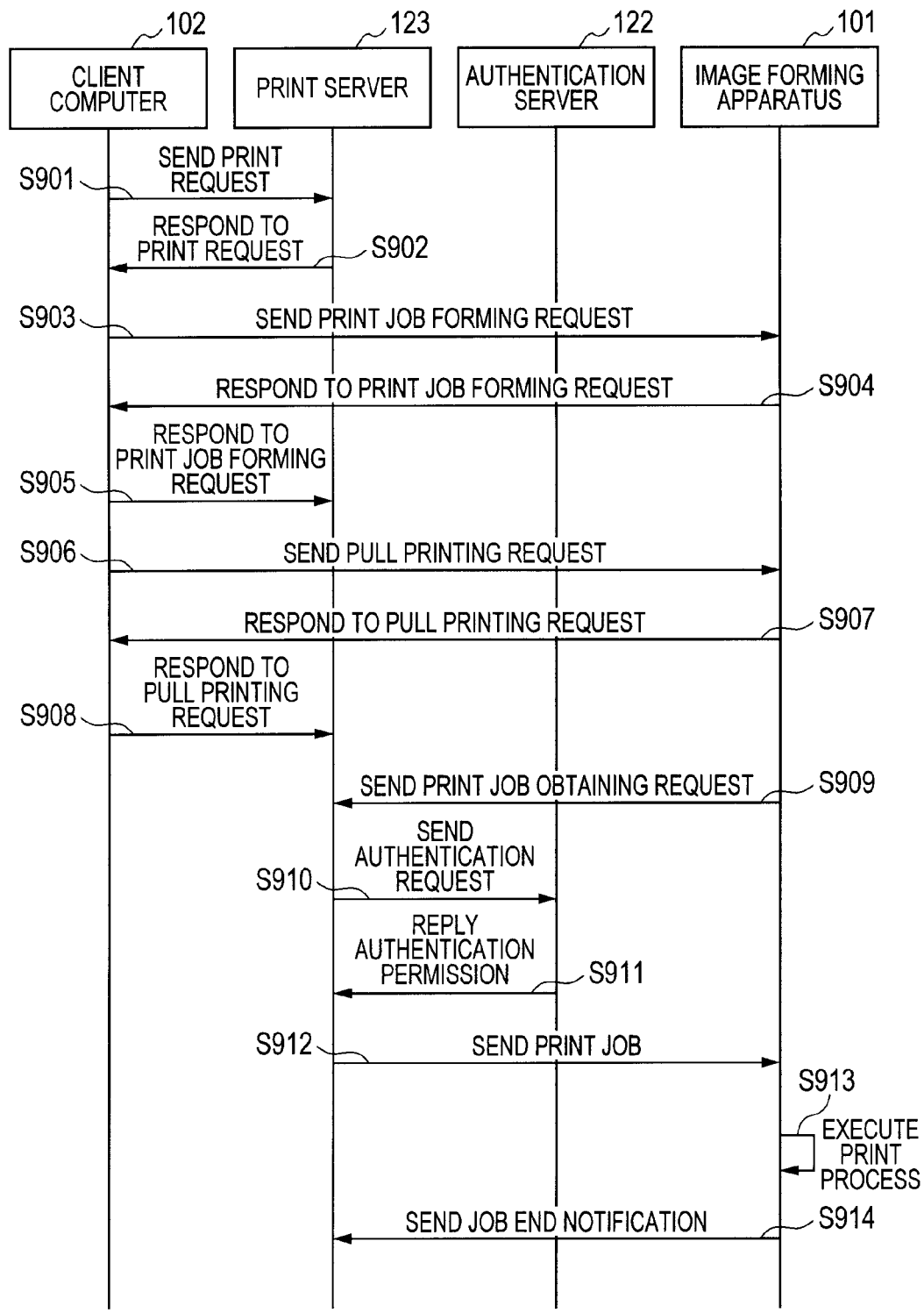
FIG. 7 is a sequence diagram for describing a print process in the first and third embodiments.

FIG. 7 is a sequence diagram for describing the print process in the first embodiment. A program for the image forming apparatus 101 regarding the print process has been stored in the external storage device 211 (FIG. 2). The program is read out therefrom, is stored into the RAM 202, and is executed by the CPU 201. A program for each of the client computer 102, print server 123, and authentication server 122 regarding the print process has been stored in the HDD 312 (FIG. 3) of each apparatus. Each program is read out of the HDD, is stored into the RAM 303, and is executed by the CPU 301. Although the requests/responses illustrated in FIGS. 8A to 8D are properly referred to in the description of the print process, a detailed description of FIGS. 8A to 8D will be made hereinafter.

The Web browser unit 501 of the client computer 102 transmits a print request of the document to the print server 123 (step S901). The print control unit 603 of the print server 123 forms the print job corresponding to the image forming apparatus 101 which is designated by the print request and temporarily stores into the storing unit.

Subsequently, the request responding unit 604 of the print server 123 transmits a response to the print request to the client computer 102 (step S902). The response to the print request includes JavaScript for allowing the client computer 102 to form/transmit a print job forming request and a pull printing request. The response to the print request includes the authentication token corresponding to the user of the client computer 102. The response to the print request also includes a URL of the print job formed in step S901.

The Web browser unit 501 of the client computer 102 executes received JavaScript. Thus, for example, a print job forming request illustrated in FIG. 8A and a pull printing request illustrated in FIG. 8C are formed. The Web browser unit 501 transmits the print job forming request to the image forming apparatus 101 (step S903).

Subsequently, the print request receiving unit 401 of the image forming apparatus 101 receives the print job forming request. The print job obtaining unit 402 receives JobID corresponding to the print job formed by the print server 123 in step S901. The print job obtaining unit 402 transmits, for example, a response to the print job forming request illustrated in FIG. 8B to the client computer 102 (step S904). The response to the print job forming request includes the formed JobID. The client computer 102 which received the response to the print job forming request makes the print job formed in step S901, that is, the print job corresponding to the URL included in the response to the print request in step S902 correspond to JobID included in the response to the print job forming request.

Subsequently, the client computer 102 redirects the received response to the print job forming request and transmits to the print server 123 (step S905).

The Web browser unit 501 of the client computer 102 transmits the pull printing request illustrated in FIG. 8C mentioned above to the image forming apparatus 101 (step S906). The pull printing request is a request for requesting the image forming apparatus 101 to perform a print job obtaining request to the print server 123. By the transmission of the pull printing request, the print server 123 can notify the image forming apparatus 101 of the URL of the print job through the client computer 102.

The pull printing request includes the HTTP expansion information. As will be described hereinafter, the HTTP expansion information includes the authentication token corresponding to the user of the client computer 102. Thus, the authentication token is transmitted from the print server 123 to the image forming apparatus 101 through the client computer 102.

A predetermined processing unit (for example, the print request receiving unit 401) of the image forming apparatus 101 transmits the response to the pull printing request to the client computer 102 (step S907). The Web browser unit 501 of the client computer 102 redirects the received pull printing request and transmits to the print server 123 (step S908).

Subsequently, the print job obtaining unit 402 (FIG. 4A) of the image forming apparatus 101 extracts the URL of the print job included in the pull printing request (S906). The HTTP header converting unit 405 analyzes the HTTP expansion information of the pull printing request and forms an HTTP header of the print job obtaining request. When the HTTP header is formed, the HTTP header converting unit 405 stores the authentication token included in the HTTP expansion information into the HTTP header. The print job obtaining unit 402 transmits the print job obtaining request having the request line including the extracted URL of the print job and the formed HTTP header to the print server 123 (step S909). Thus, even if the print job obtaining request illustrated in FIG. 8D is transmitted to the print server 123.

Subsequently, the authentication control unit 607 of the print server 123 extracts the authentication token from the HTTP header of the print job obtaining request received from the image forming apparatus 101. The authentication control unit 607 transmits the authentication token to the authentication server 122 and performs the authenticating request (step S910). Subsequently, the authentication server 122 collates the authentication token received from the authentication control unit 607 with the held authentication token, thereby executing the authenticating process of the user. If the authentication of the user is successful, the authentication server 122 transmits information (authentication permission information) showing the success in the authentication to the print server 123 (step S911).

Subsequently, the print job obtaining request processing unit 605 of the print server 123 transmits the print job to the image forming apparatus 101 (step S912). Specifically speaking, the print job obtaining request processing unit 605 obtains the print data indicated by a document identifier of the print data included in the print job obtaining request, forms a print job including the print data, and transmits to the image forming apparatus 101. Thus, the image forming apparatus 101 obtains the print data including the print job. The print job which is transmitted is a print job which was identified by the print server 123 on the basis of JobID included in the response to the print job forming request (S905).

Subsequently, the print job obtaining unit 402 of the image forming apparatus 101 processes the print job received from the print server 123 and executes the printing (step S913). When the printing is finished, the event notifying unit 404 of the image forming apparatus 101 transmits a job end notification to the print server 123 (step S914). The job end notification is transmitted in order to allow the image forming apparatus 101 to notify the print server 123 that the print process was finished.

FIGS. 8A to 8D are diagrams illustrating an example of requests/responses which are transmitted and received in the print system. FIG. 8A illustrates the example of the print job forming request which is transmitted to the image forming apparatus 101 by the client computer 102. A <CreatePrintJobRequest> tag 1001 indicates that the request is the print job forming request. The user name of the user who operates the client computer 102 has been stored in a <JobOriginatingUserName> tag. The image forming apparatus 101 which received the print job forming request in S903 in FIG. 7 mentioned above makes the user corresponding to the user name included in the print job forming request correspond to JobID.

FIG. 8B is the example of a response to the print job forming request which is transmitted to the client computer 102 by the image forming apparatus 101. A <CreatePrintJobResponse> tag 1011 indicates that this request is a response to the print job forming request. A <JobId> tag 1012 indicates jobID.

FIG. 8C illustrates the example of the pull printing request which is transmitted to the image forming apparatus 101 by the client computer 102. A <httpExtension> tag 1022 in FIG. 8C and tags which are under the domination of it correspond to items obtained by expanding the format of the WSD print. That is, since the print server 123 expanded the format, it is required that the image forming apparatus 101 is an apparatus which can interpret the expansion information.

A <AddDocumentRequest> tag 1021 indicates that the request is a pull printing request. The <httpExtension> tag 1022 is an HTTP expansion information tag and the HTTP expansion information is stored. A <Header> tag showing the expansion information regarding the HTTP header exists under the domination of the <httpExtension> tag 1022.

<Name> tags 1023 and 1025 which are under the domination of the <Header> tag indicate information before the conversion of a field name of the HTTP header. <Value> tags 1024 and 1026 indicate information before the conversion of a field value of the HTTP header.

The <Name> tag 1023 indicates that information stored in the <Value> tag 1024 is authentication information. Specifically speaking, the authentication token has been stored in the <Value> tag 1024. An authorization token may be stored in the <Value> tag 1024. The <Name> tag 1025 indicates that information stored in the <Value> tag 1026 is identification information of the document. Specifically speaking, as information showing the print data corresponding to the print request which was performed to the print server 123 by the client computer 102, a document identifier of the print data is stored in the <Value> tag 1026. A <DocumentUrl> tag 1027 indicates a URL for allowing the print server 123 to access a service providing unit for providing the print job which has temporarily been stored. The image forming apparatus 101 transmits the print job obtaining request to the URL.

FIG. 8D illustrates the example of the print job obtaining request which is transmitted to the print server 123 by the image forming apparatus 101. The image forming apparatus 101 designates GET as a method of the print job obtaining request and designates the URL stored in the <DocumentUrl> tag 1027 in FIG. 8C as a path (refer to reference numeral 1031). That is, a GET operation of an HTTP protocol has been set in the print job obtaining request.

The image forming apparatus 101 describes the authentication token designated in the tags 1023 and 1024 of the pull printing request illustrated in FIG. 8C into an HTTP header 1032. The image forming apparatus 101 describes the authentication token designated in the tags 1025 and 1026 of the pull printing request illustrated in FIG. 8C into an HTTP header 1033.

Figure 12:
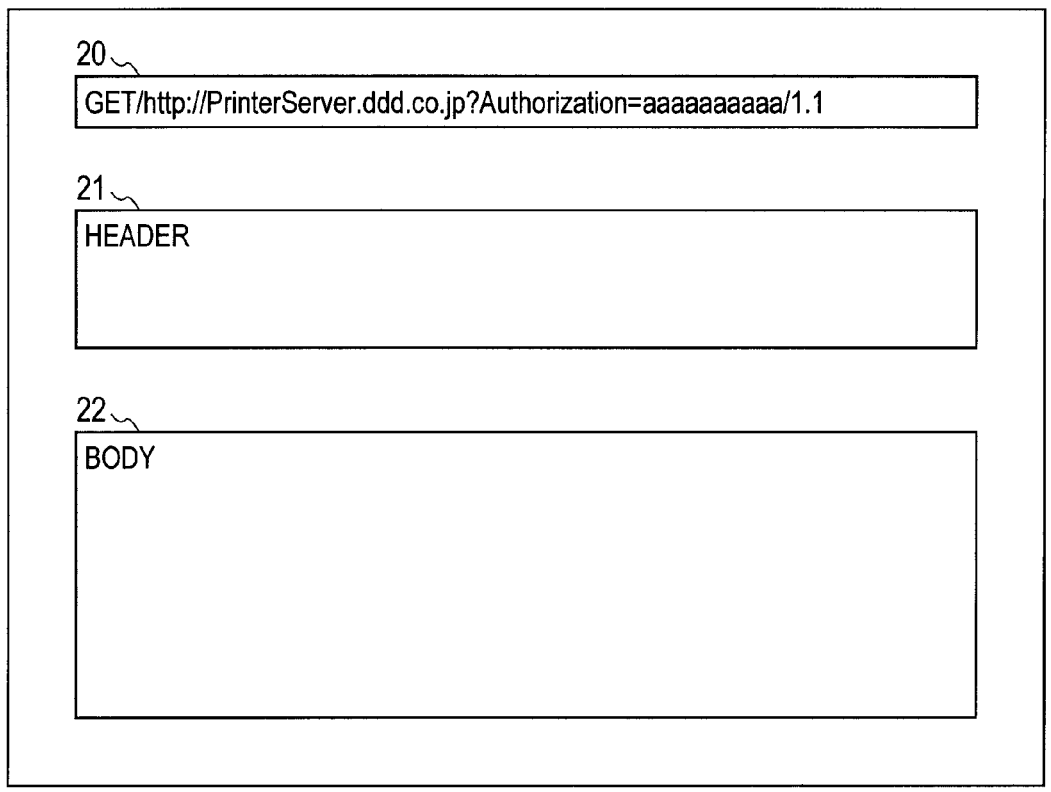
FIG. 12 is a diagram illustrating an example of a print job obtaining request including an authentication token after query string of a request line of an HTTP.

As a format of the print job obtaining request, besides the format illustrated in FIG. 8D, a format in which the authentication token is stored into the request line is considered. FIG. 12 is a diagram illustrating an example of the format of the print job obtaining request in which the authentication token has been stored in the request line. The print job obtaining request includes a request line 20, a header 21, and a body 22. In the request line 20, GET is designated as a method and "PrintServer.ddd.co.jp" is designated as a path. In this example, the authentication token is designated after query string "?".

However, according to the format in which the authentication token is stored in the request line as illustrated in FIG. 12, the information showing the authentication token is transmitted up to an application level. Therefore, according to this format, the authentication at a level of a lower layer, that is, at a level of the Web server (print server) cannot be performed. By describing the authentication token into the HTTP header as shown in the embodiment, the user authentication at the level of the lower layer can be made.

Figures 9, 10:
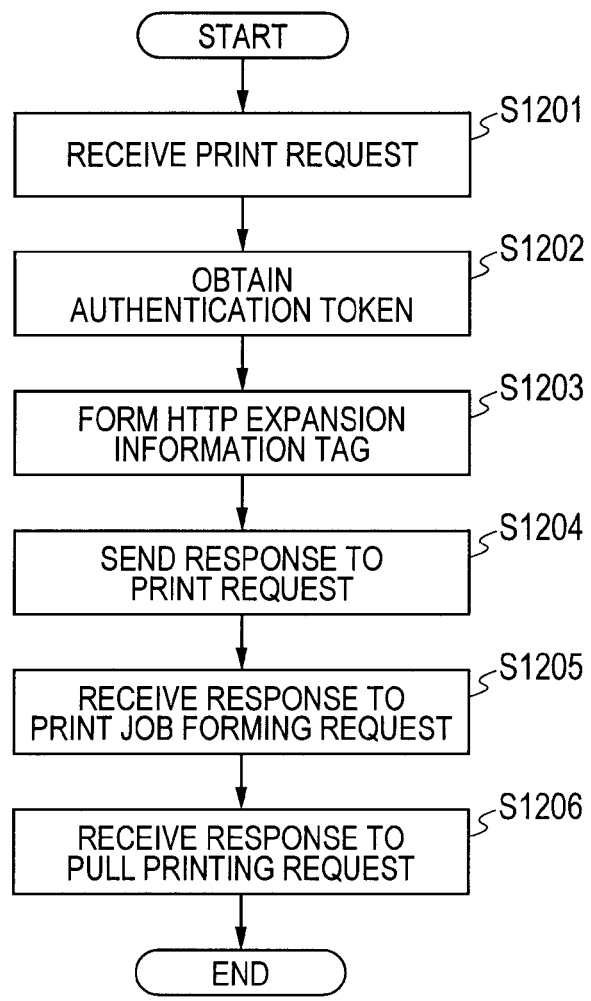
FIG. 9 is a diagram illustrating an example of an HTTP header management table.
FIG. 10 is a flowchart for describing an operating process of the print server.

FIG. 9 is a diagram illustrating an example of the HTTP header management table. The HTTP header management table 406 is formed every user. That is, the image forming apparatus 101 specifies the user corresponding to JobID included in the pull printing request received in S906 in FIG. 7 and forms the HTTP header management table corresponding to the user. The HTTP header management table 406 has data items such as Name and Value. Information designated in the <Name> tag of the pull printing request illustrated in FIG. 8C is set into Name. When the print job obtaining request is transmitted, the image forming apparatus 101 uses a value of Name as a field name of the HTTP header. Information designated in the <Value> tag of the pull printing request illustrated in FIG. 8C is set into Value. When the print job obtaining request is transmitted, the image forming apparatus 101 uses a value of Value as a field value of the HTTP header.

FIG. 10 is a flowchart for describing an operating process of the print server. A program of the print server 123 regarding the operating process, which will be described with reference to FIG. 10, has been stored in the HDD 312 of the print server 123. The program is read out of the HDD, is stored into the RAM 303, and is executed by the CPU 301.

The print server 123 receives the print request from the client computer 102 (step S1201). Subsequently, the print server 123 obtains the authentication token from the authentication server 122 (step S1202). The print server 123 forms an HTTP expansion information tag including the authentication token and the document identifier (step S1203).

Subsequently, the print server 123 transmits a response to the print request including the HTTP expansion information tag to the client computer 102 (step S1204). The client computer 102 which received the response to the print request forms the pull printing request in which the authentication token and the document identifier in the HTTP expansion tag included in the response to the print request are included in the <httpExtension> tag 1022. Subsequently, the print server 123 receives the response to the print job forming request from the client computer 102 (step S1205). The print server 123 receives the response to the pull printing request from the client computer 102 (step S1206).

Figure 11:
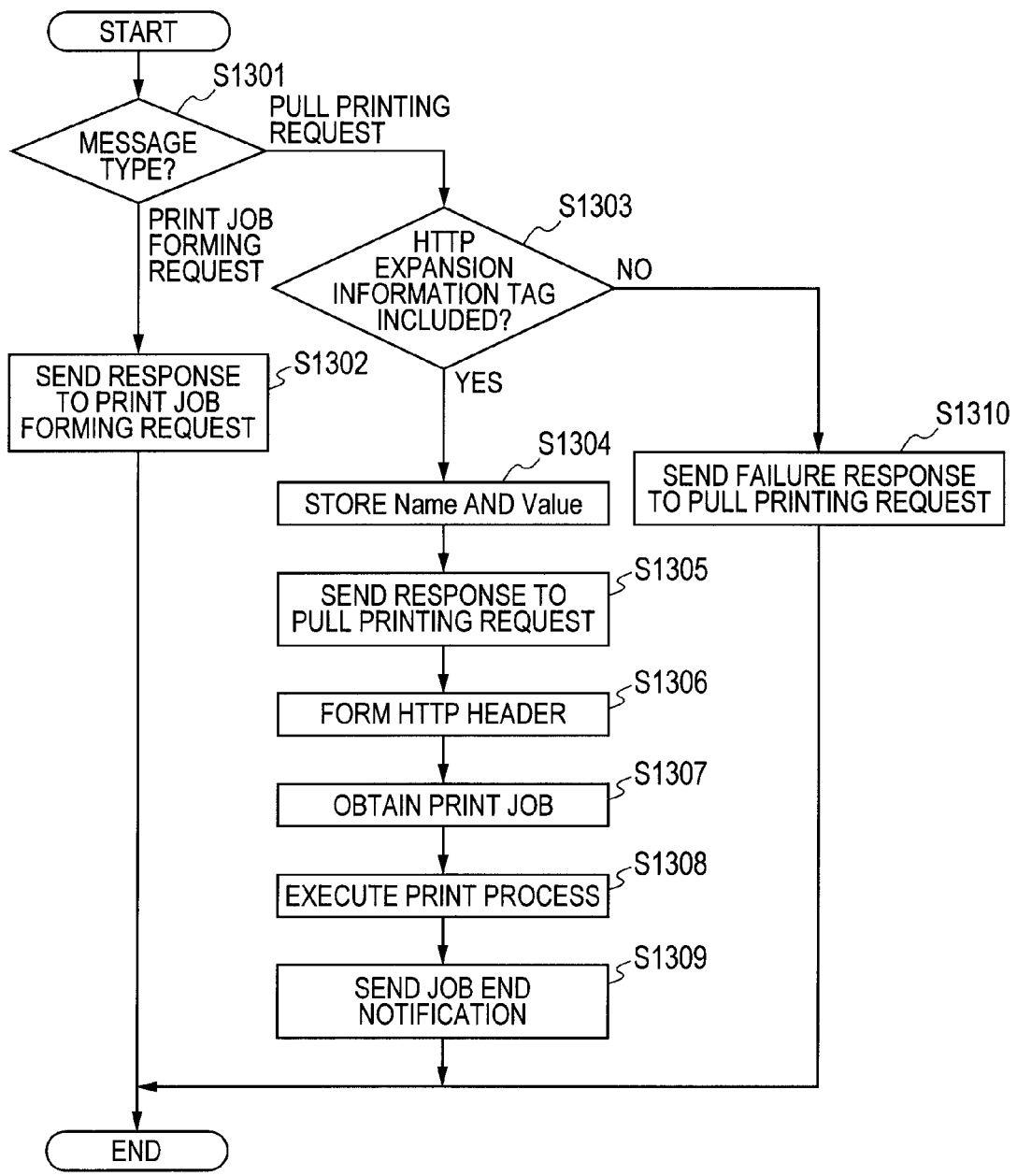
FIG. 11 is a flowchart for describing an operating process of the image forming apparatus.

FIG. 11 is a flowchart for describing the operating process of the image forming apparatus. A program of the image forming apparatus 101 regarding the operating process, which will be described with reference to FIG. 10, has been stored in the HDD 211 of the image forming apparatus 101. The program is read out of the HDD, is stored into the RAM 202, and is executed by the CPU 201.

The image forming apparatus 101 receives a message from the client computer 102 and discriminates the message (step S1301). When the message is the print job forming request, the image forming apparatus 101 transmits a response to the print job forming request to the client computer 102 (step S1302). When the message is the pull printing request, the image forming apparatus 101 analyzes the pull printing request and discriminates whether or not the pull printing request includes the HTTP expansion information tag (step S1303).

If it is determined by the image forming apparatus 101 that the pull printing request includes the HTTP expansion information tag, the image forming apparatus 101 stores Name and Value serving as sources of the field name and the field value of the HTTP header into the HTTP header management table 406 (step S1304). Thus, the authentication token and the document identifier of the print data corresponding to the print request are stored into the HTTP header management table 406. The image forming apparatus 101 transmits a response to the pull printing request to the client computer 102 (step S1305).

Subsequently, on the basis of Name and Value stored in the HTTP header management table 406 in step S1304, the image forming apparatus 101 forms an HTTP header of the print job obtaining request (step S1306). The image forming apparatus 101 transmits the print job obtaining request including the formed HTTP header to the print server 123 and obtains the print job (step S1307).

Subsequently, the image forming apparatus 101 executes the print process (step S1308). The image forming apparatus 101 transmits the job end notification to the print server 123 (step S1309).

In step S1303 mentioned above, if the image forming apparatus 101 determined that the pull printing request does not include the HTTP expansion information tag, the image forming apparatus 101 transmits the failure response to the pull printing request to the client computer 102 (step S1310)

According to the print system of the embodiment, in the execution of the pull printing, the authentication can be made every user. Specifically speaking, when the user of the client computer 102 inputs the user ID and password at the time of login, the authentication token corresponding to the user is issued. When the print request is performed to the print server 123 from the client computer 102, the authentication token is transmitted to the image forming apparatus 101 through the print server 123 and the client computer 102.

The image forming apparatus 101 which received the authentication token allows the authentication token to be included in the print request (print job obtaining request) of the pull printing and transmits to the print server 123. The print server 123 transmits the authentication token included in the print job obtaining request to the authentication server 122 and performs the authenticating request. That is, if the user inputs the user ID and password at the time of login, when receiving the offer of the print service from the print server 123, the user can receive the authentication without inputting the user ID and password again. Therefore, according to the print system of the embodiment, even in the case where an authenticating method which is used in the pull printing was changed, it is sufficient to change the software of the print server 123. There is no need to change the software of the image forming apparatus 101.

In the embodiment, the print server 123 allows the document identifier to be included into the HTTP expansion information tag 1022 and transmits the pull printing request. When the pull printing request is received, the image forming apparatus 101 transmits the print job obtaining request in which the document identifier is included in the HTTP header. Since the print job which is obtained by the print job obtaining request can be individually designated by the document identifier, the URL of the print job obtaining request can be always made identical.

Second Embodiment

Figure 13:
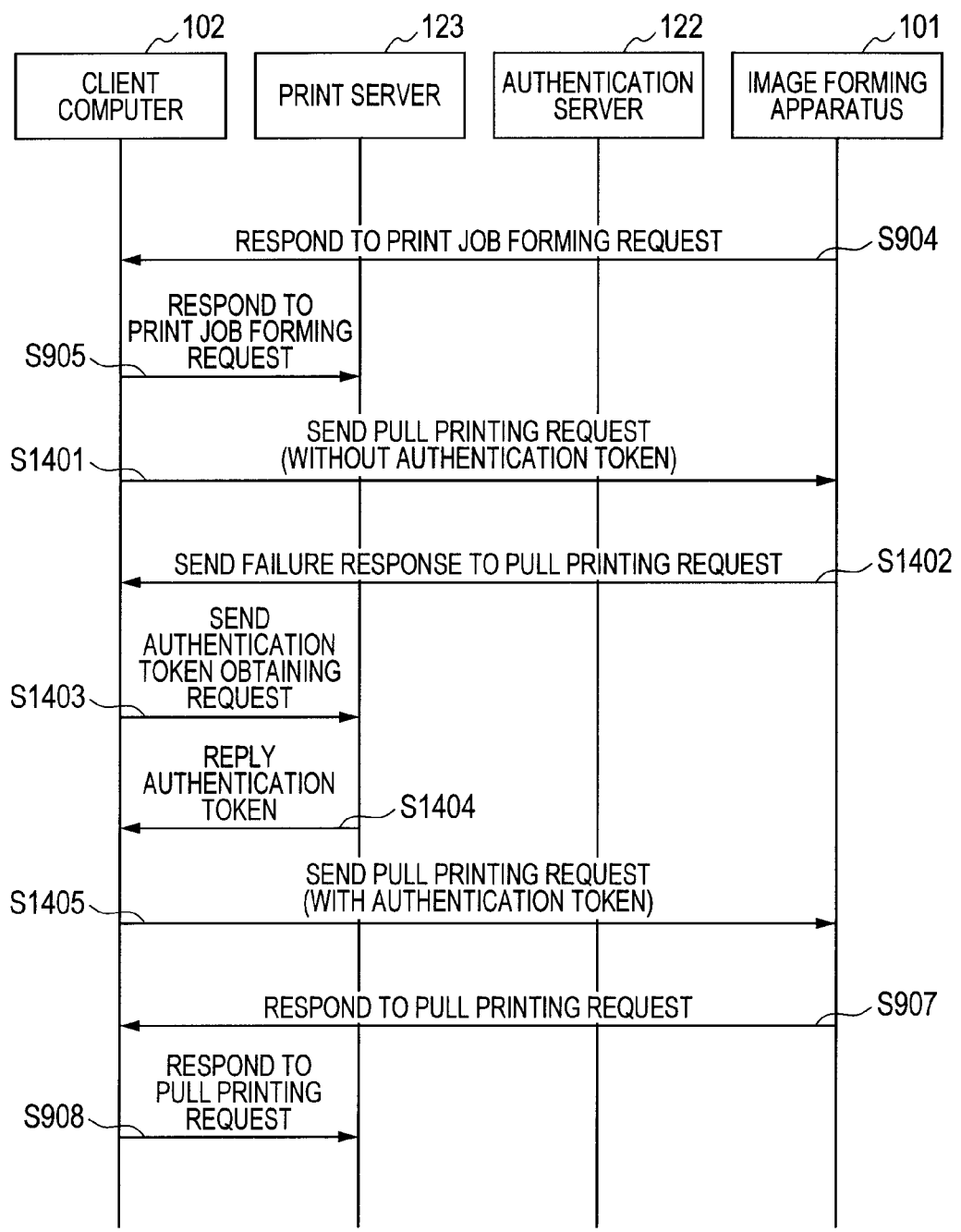
FIG. 13 is a sequence diagram for describing a print process in the second embodiment.

FIG. 13 is a sequence diagram for describing a print process in the second embodiment. In this embodiment, the image forming apparatus 101 holds the authentication token for a predetermined time. Only when the image forming apparatus 101 does not hold the authentication token, the print server 123 transmits the pull printing request including the authentication token. According to the second embodiment, since it is not always necessary that the print server 123 transmits the authentication token every time, the number of times of flowing of the authentication token onto the network can be reduced. Thus, the number of times of wiretapping of the authentication token can be reduced. A description of the second embodiment regarding the same portions as those in the first embodiment is omitted and only different portions will be described hereinbelow.

FIG. 13 is the sequence diagram for describing the print process in the second embodiment. In the print process in this embodiment, processes up to step S905 are similar to the print process in the first embodiment described with reference to FIG. 7, their description is omitted here. In step S1401, the Web browser unit 501 of the client computer 102 transmits the pull printing request to the image forming apparatus 101.

FIG. 14A is an example of the pull printing request which is transmitted in S1401. A <AddDocumentRequest> tag 1501 indicates that this request is the pull printing request. A <httpExtension> tag 1502 is an HTTP expansion information tag and the HTTP expansion information is stored therein. Although the HTTP expansion information is included in the pull printing request illustrated in FIG. 14A, the authentication token is not included. Although the image forming apparatus 101 analyzes the HTTP expansion information of the pull printing request, the authentication token is not included in the pull printing request.

The image forming apparatus 101 which confirmed that the authentication/authorization token is not included in the pull printing request specifies the user corresponding to JobID included in the pull printing request and refers to the HTTP header management table 406 corresponding to the user. The image forming apparatus 101 confirms whether or not the authentication token corresponding to the user has been stored in the HTTP header management table 406. If the authentication token is not stored, the image forming apparatus 101 transmits the failure response to the pull printing request to the client computer 102 in step S1402 in FIG. 13.

FIG. 14B is an example of the failure response to the pull printing request which is transmitted in step S1402 in FIG. 13. A <Fault> tag 1511 indicates that this response is the failure response to the pull printing request. In this example, the failure response to the pull printing request has a format of SoapFault. The failure response to the pull printing request can be set into an arbitrary format in which the client computer 102 can confirm that it failed in the pull printing request because there is no authentication token in the pull printing request.

A <Subcode> tag 1512 indicates a failure subcode. A <Reason> tag 1513 indicates a reason of the failure. It is sufficient that the failure response to the pull printing request includes either the tag 1512 or the tag 1513. A character string described in the tag 1512 or the tag 1513 can be set to an arbitrary character string by which such a fact that the pull printing request has failed because there is no authentication token in the pull printing request can be recognized. The foregoing failure response to the pull printing request functions as a request for requesting the client computer 102 to transmit the authentication token.

Returning to FIG. 13, the client computer 102 receives the failure response to the pull printing request and transmits an authentication token obtaining request to the print server 123 (step S1403). The authentication token obtaining request is a request for requesting the obtainment of the authentication token. In response to the authentication token obtaining request received from the client computer 102, the request responding unit 604 of the print server 123 transmits the authentication token corresponding to the user of the client computer 102 to the client computer 102 (step S1404).

Subsequently, the client computer 102 receives the authentication token transmitted from the print server 123 in step S1404. The client computer 102 forms the pull printing request in which the received authentication token is held in the HTTP expansion information and transmits the formed pull printing request to the image forming apparatus 101 again (step S1405).

Since processes in step S907 and subsequent steps are similar to the processes described with reference to FIG. 7, their description is omitted here. In the second embodiment, the authentication token is not included in the pull printing request of the first time. However, since the image forming apparatus 101 does not hold the authentication token at the time of transmission of the pull printing request of the first time, the authentication token may be certainly included in the pull printing request of the first time.

Figure 15:
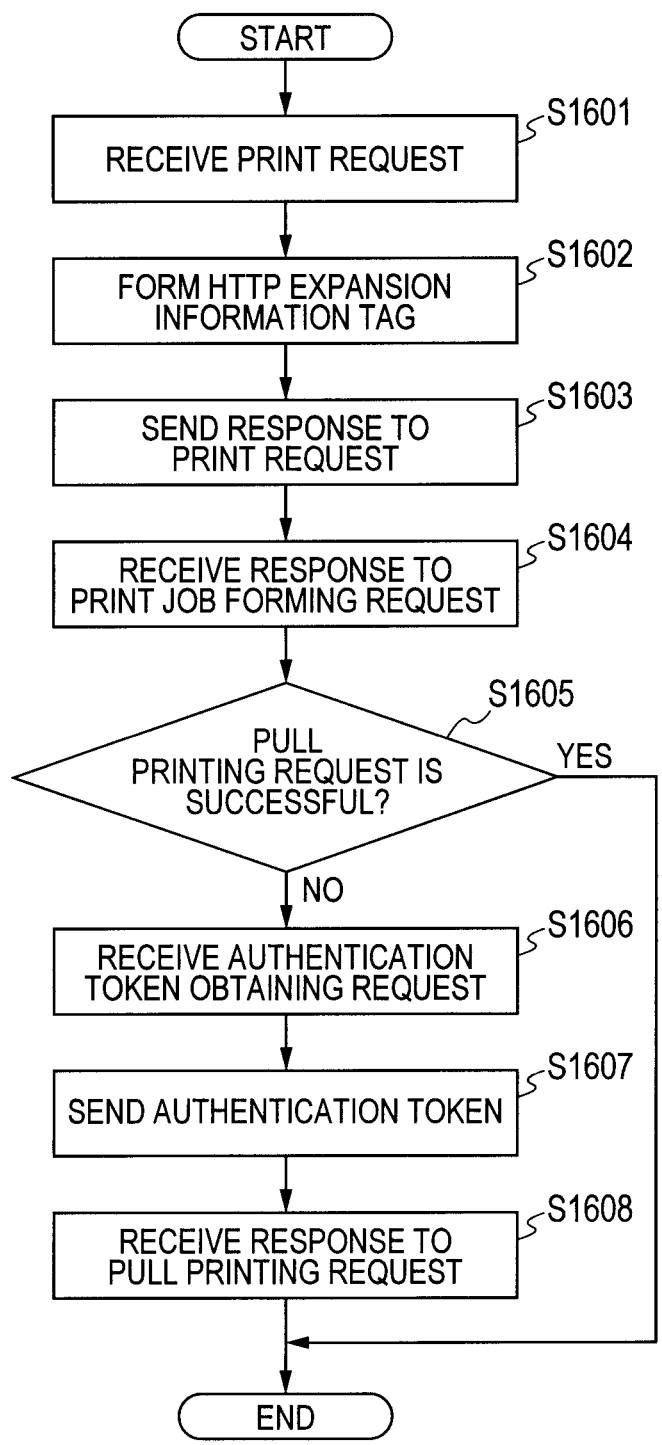
FIG. 15 is a flowchart for describing an operating process of a print server in the second embodiment.

FIG. 15 is a flowchart for describing an operating process of the print server in the second embodiment. A program for the print server 123 regarding the operating process has been stored in the HDD 312 of the print server 123. The program is read out of the HDD, is stored into the RAM 303, and is executed by the CPU 301.

The print server 123 receives the print request from the client computer 102 (step S1601). Subsequently, the print server 123 forms the HTTP expansion information tag which does not include the authentication token (step S1602).

Subsequently, the print server 123 transmits a response to the print request including the HTTP expansion information tag to the client computer 102 (step S1603). Subsequently, the print server 123 receives a response to the print job forming request from the client computer 102. The apparatus waits until the print server 123 receives the response to the pull printing request.

The print server 123 discriminates whether or not the pull printing request is successful (step S1605). If the print server 123 receives the response to the pull printing request, the print server 123 determines that the pull printing request was successful. If the print server 123 does not receive the response to the pull printing request, the print server 123 determines that the pull printing request failed.

If the print server 123 determines that the pull printing request was successful, the processing routine is finished. If the print server 123 determines that the pull printing request failed, the processing routine advances to step S1606.

In step S1606, the print server 123 receives the authentication token obtaining request from the client computer 102 (step S1606). Subsequently, the print server 123 obtains the authentication token from the authentication server 122 and transmits the obtained authentication token to the client computer 102 (step S1607). The print server 123 receives the response to the pull printing request from the client computer 102 (step S1608).

Figure 16:
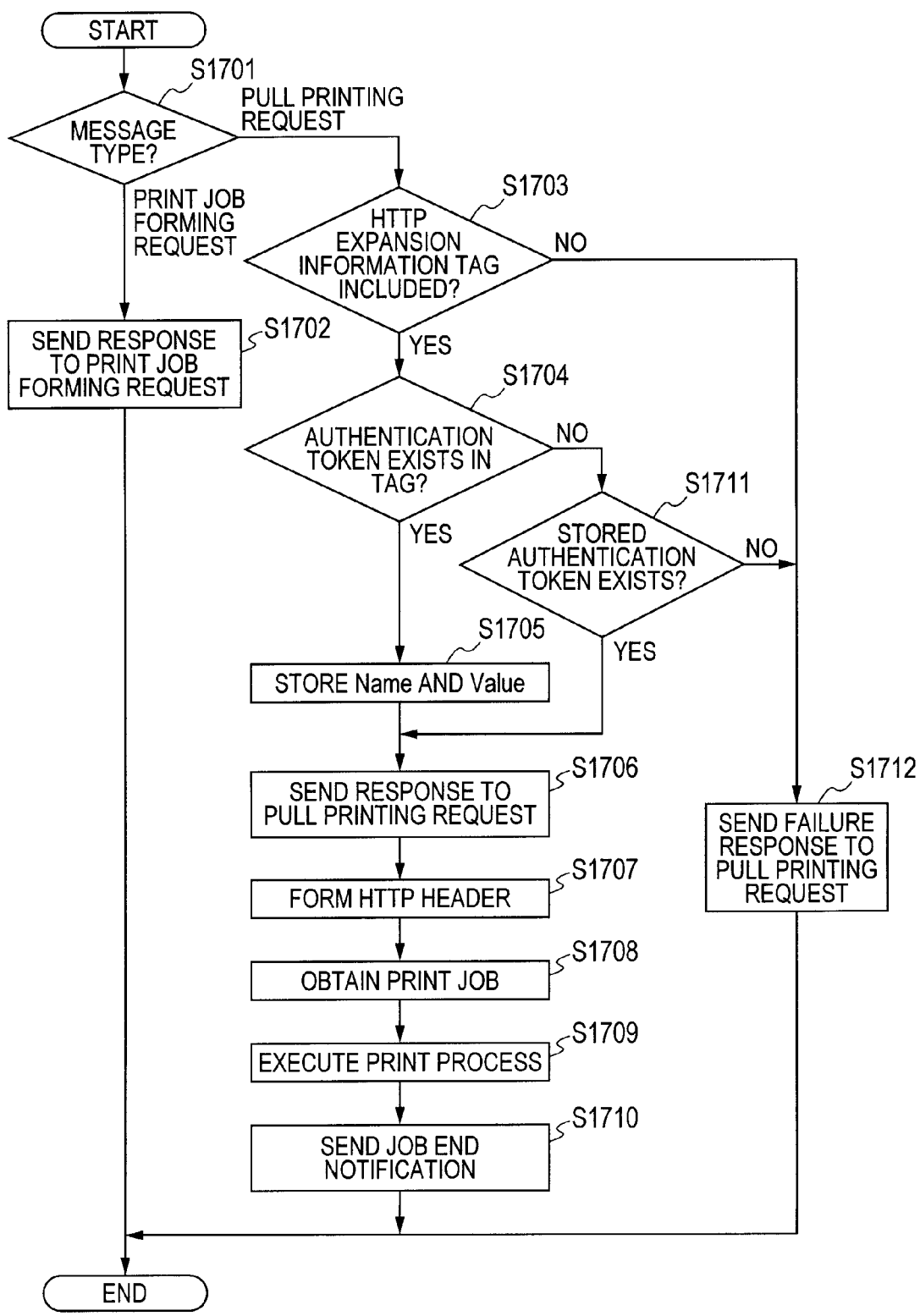
FIG. 16 is a flowchart for describing an operating process of an image forming apparatus in the second embodiment.

FIG. 16 is a flowchart for describing an operating process of the image forming apparatus in the second embodiment. A program for the image forming apparatus 101 regarding the operating process has been stored in the HDD 211 of the image forming apparatus 101. The program is read out of the HDD, is stored into the RAM 202, and is executed by the CPU 201.

Processes in steps S1701 to S1703 in FIG. 16 are similar to those in steps S1301 to S1303 in FIG. 11. Processes in steps S1706 to S1710 in FIG. 16 are similar to those in steps S1305 to S1309 in FIG. 11.

If the print request receiving unit 401 of the image forming apparatus 101 determines that the HTTP expansion information tag is included in the pull printing request (YES in S1703), step S1704 follows. The print request receiving unit 401 discriminates whether or not the authentication token is included in the HTTP expansion information tag (step S1704). If the print request receiving unit 401 determines that the authentication token is included in the HTTP expansion information tag, step S1705 follows. The print request receiving unit 401 stores Name and Value serving as sources of the field name and the field value of the HTTP header into the HTTP header management table 406 for a predetermined period of time (step S1705). Thus, the authentication token and the document identifier of the print data corresponding to the print request are stored into the HTTP header management table 406.

If the print request receiving unit 401 determines that the authentication token is not included in the HTTP expansion information tag (NO in S1704), step S1711 follows. In step S1711, by referring to the HTTP header management table 406, the HTTP header converting unit 405 discriminates whether or not the authentication token has been stored in the HTTP header management table 406. If the HTTP header converting unit 405 determines that the authentication token has been stored, step S1706 follows. If the HTTP header converting unit 405 determines that the authentication token is not stored, step S1712 follows. The print request receiving unit 401 transmits the failure response to the pull printing request to the client computer 102 (step S1712).

In the second embodiment, the image forming apparatus 101 discriminates whether or not the authentication token has been described in the HTTP expansion information tag included in the pull printing request (YES in S1703 in FIG. 16, S1704). If the authentication token is not described in the HTTP expansion information tag (NO in S1704) and the authentication token has been stored in the HTTP header management table 406 (YES in S1711), the image forming apparatus 101 transmits the response to the pull printing request (S1706). Therefore, according to the print system of the embodiment, it is not always necessary that the print server 123 transmits the authentication token every time. Even if the image forming apparatus 101 deleted the authentication token or the like, the authentication token can be obtained by requesting the authentication token to the print server 123.

Third Embodiment

In the third embodiment, the print server 123 forms the pull printing request including the token information and transmits JavaScript to the client computer 102 as a response to the print request. The pull printing request including the token information is included in JavaScript. By executing JavaScript, the client computer 102 transmits the pull printing request to the image forming apparatus 101. A description of the third embodiment regarding the same portions as those in the first embodiment is omitted and only different portions will be described hereinbelow.

The Web browser unit 501 transmits the pull printing request including the token information to the image forming apparatus 101 by executing JavaScript received from the print server 123. Specifically speaking, the print server 123 forms the pull printing request including the HTTP expansion information in which the token information which was made to correspond to the user has been described. As an operation which is peculiar to the embodiment, the Web browser unit 501 executes JavaScript of the response to the print request which is returned from the print server 123, thereby transmitting the pull printing request formed by the print server 123 to the image forming apparatus 101. In other words, the print server 123 forms the print request of the pull printing including the token information and returns the response to the print request to the client computer 102, thereby instructing the image forming apparatus 101 to transmit the pull printing request from the client computer 102.

The request responding unit 604 of the print server 123 receives the print request from the Web server unit 601. The request responding unit 604 functions as a print request responding unit for returning the response to the print request to the client computer 102 through the network 121. The response to the print request includes JavaScript for allowing the client computer 102 to transmit the print job forming request and the pull printing request. In the response to the print request, the authentication token corresponding to the user of the client computer 102 of the transmitting source of the print request and the information showing the print data corresponding to the print request are included in the HTTP expansion information. JavaScript is a script for allowing the client computer 102 to transmit the pull printing request. The client computer 102 executes JavaScript included in the response to the print request, thereby transmitting the pull printing request including the authentication token as its HTTP expansion information to the image forming apparatus 101 through the network 106.

FIG. 7 is a sequence diagram for describing the print process in the third embodiment.

The Web browser unit 501 of the client computer 102 transmits the print request of the document to the print server 123 (step S901). The print control unit 603 of the print server 123 forms the print job corresponding to the image forming apparatus 101 which is designated by the print request and temporarily stores into the storing unit.

Subsequently, the request responding unit 604 of the print server 123 transmits a response to the print request to the client computer 102 (step S902). The response to the print request includes JavaScript for allowing the client computer 102 to transmit the print job forming request and the pull printing request. The response to the print request also includes the authentication token corresponding to the user of the client computer 102. The response to the print request also includes the URL of the print job formed in step S901.

The Web browser unit 501 of the client computer 102 executes received JavaScript. Thus, for example, the print job forming request illustrated in FIG. 8A and the pull printing request illustrated in FIG. 8C are transmitted. The Web browser unit 501 transmits the print job forming request to the image forming apparatus 101 (step S903).

Subsequently, the print request receiving unit 401 of the image forming apparatus 101 receives the print job forming request. The print job obtaining unit 402 forms JobID corresponding to the print job formed by the print server 123 in step S901. The print job obtaining unit 402 transmits, for example, the response to the print job forming request illustrated in FIG. 8B to the client computer 102 (step S904). The response to the print job forming request includes formed JobID mentioned above. The client computer 102 which received the response to the print job forming request makes the print job formed in S901, that is, the print job corresponding to the URL included in the response to the print request in S902 correspond to JobID included in the response to the print job forming request.

Subsequently, the client computer 102 redirects the received response to the print job forming request and transmits to the print server 123 (step S905).

The Web browser unit 501 of the client computer 102 transmits the pull printing request illustrated in FIG. 8C mentioned above to the image forming apparatus 101 (step S906). The pull printing request is a request for requesting the image forming apparatus 101 to perform the print job obtaining request to the print server 123. By the transmission of the pull printing request, the print server 123 can notify the image forming apparatus 101 of the URL of the print job through the client computer 102.

The pull printing request includes the HTTP expansion information. The HTTP expansion information includes the authentication token corresponding to the user of the client computer 102. Thus, the authentication token is transmitted from the print server 123 to the image forming apparatus 101 through the client computer 102.

Since processes in step S907 and subsequent steps are similar to the processes described with reference to FIG. 7, their description is omitted here.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-129251, filed Jun. 9, 2011, which is hereby incorporated by reference herein in its entirety.

What is claimed is:

1. A print system comprising a server apparatus for providing a print service, a user apparatus and a printer for printing a document,
    wherein the server apparatus comprises a command transmitting unit configured to transmit a command to the user apparatus, the command commanding the user apparatus to send to the printer a print request for pull printing including authorized information used for an authorizing process at the time of receiving the print service,
    wherein the user apparatus comprises an instruction unit which instructs the print request for pull printing including the authorized information to the printer by receiving the command which is script format executable on a Web browser from the command transmitting unit of the server and executing the command on the Web browser,
    wherein the printer comprises:
    a request transmitting unit configured to transmit, in accordance with the instruction issued from the instruction unit of the user apparatus, the authorized information and a document obtaining request to the server apparatus, wherein, when the authorized information is not received with the instruction issued from the instruction unit, the printer transmits a failure response to the print request for pull printing to the user apparatus, and
    wherein the server apparatus executes the authorizing process on the basis of the authorized information transmitted by the request transmitting unit of the printer without requesting a user to input authentication information, and wherein, based on authorization in the authorizing process, the server apparatus transmits a requested document to the printer in response to the document obtaining request transmitted by the request transmitting unit.

2. The system according to claim 1, wherein the print request for pull printing has a format in which a print request format for WSD (Web Service on Device) pull printing is expanded so as to include the authorized information.

3. A server apparatus for providing a print service, comprising:
    a command transmitting unit configured to transmit a command to a user apparatus, the command commanding the user apparatus to send to a printer a print request for pull printing, including authorized information used for an authorizing process at the time of receiving the print service; and
    a receiving unit configured to receive authorized information and a document obtaining request from the printer,
    wherein the user apparatus comprises an instruction unit which instructs the print request for pull printing including authorized information to the printer by receiving the command which is script format executable on a Web browser from the command transmitting unit of the server apparatus and executing the command on the Web browser,
    wherein the printer transmits, in accordance with the instruction issued from the instruction unit of the user apparatus, the authorized information and the document obtaining request to the server apparatus, wherein, when the authorized information is not received with the instruction issued by the instruction unit, the printer transmits a failure response to the print request for pull printing to the user apparatus, and wherein the server apparatus executes the authorizing process on the basis of the authorized information transmitted from the printer without requesting a user to input authentication information, and wherein, based on authorization in the authorizing process, the server apparatus transmits a requested document to the printer in response to the document obtaining request transmitted from the printer.

4. A printer which can communicate with a server apparatus for providing a print service and a user apparatus, the printer comprising:

a request transmitting unit configured to transmit, in accordance with an instruction issued from the user apparatus, authorized information and a document obtaining request to the server apparatus, wherein the user apparatus instructs a print request for pull printing including the authorized information to the printer by receiving a command which is script format executable on a Web browser from the server apparatus and executing the command on the Web browser, the authorized information being used for an authorizing process at the time of receiving the print service; and a print unit configured to print a document, wherein, when the authorized information is not received with the instruction issued by the user apparatus, the printer transmits a failure response to the print request for pull printing to the user apparatus, and wherein the server apparatus executes the authorizing process on the basis of the authorized information transmitted by the request transmitting unit without requesting a user to input authentication information, and wherein, based on authorization in the authorizing process, the server apparatus transmits the document to the printer in response to the document obtaining request transmitted by the request transmitting unit.

5. A method for controlling a print system comprising a server apparatus for providing a print service, a user apparatus and a printer for printing a document, the method comprising:

transmitting, from the server apparatus, a command to the user apparatus, the command commanding the user apparatus to send to the printer a print request for pull printing including authorized information used for an authorizing process at the time of receiving the print service;

receiving, at the user apparatus, the command which is script format executable on a Web browser, from the server apparatus;

instructing, at the user apparatus, the print request for pull printing including the authorized information to the printer by executing the command on the Web browser;

transmitting, from the printer, in accordance with the instruction issued from the user apparatus, the authorized information and a document obtaining request to the server apparatus, wherein, when the authorized information is not received with the instruction, the printer transmits a failure response to the print request for pull printing to the user apparatus, and wherein the server apparatus executes the authorizing process on the basis of the transmitted authorized information without requesting a user to input authentication information; and transmitting, from the server apparatus, based on authorization in the authorizing process, a requested document to the printer in response to the transmitted document obtaining request.

6. A non-transitory computer-readable storage medium storing a computer-executable program for causing a computer to execute a method carried out in a printer which can communicate with a server apparatus for providing a print service and a user apparatus, the method comprising:

transmitting, in accordance with an instruction issued from the user apparatus, authorized information and a document obtaining request to the server apparatus; wherein the user apparatus instructs a print request for pull printing including the authorized information to the printer by receiving a command which is script format executable on a Web browser from the server apparatus and executing the command on the Web browser, the authorized information being used for an authorizing process at the time of receiving the print service; and printing a document, wherein, when the authorized information is not received with the instruction issued from the user apparatus, the printer transmits a failure response to the print request for pull printing to the user apparatus, and wherein the server apparatus executes the authorizing process on the basis of the transmitted authorized information without requesting a user to input authentication information, and wherein, based on authorization in the authorizing process, the server apparatus transmits the document to the printer in response to the transmitted document obtaining request.

7. A non-transitory computer-readable storage medium storing a computer-executable program for causing a computer to execute the method according to claim 5.

* * * * *